Dec. 10, 1929.   J. R. BROWN   1,738,688
FLOAT OPERATED CIRCUIT CLOSER
Filed Sept. 11, 1922

INVENTOR.
John Rowland Brown
BY
Fay, Oberlin & Fay
ATTORNEYS

Patented Dec. 10, 1929

1,738,688

UNITED STATES PATENT OFFICE

JOHN ROWLAND BROWN, OF CLEVELAND, OHIO, ASSIGNOR TO THE RELIANCE GAUGE COLUMN COMPANY, OF CLEVELAND, OHIO, A CORPORATION OF OHIO

FLOAT-OPERATED CIRCUIT CLOSER

Application filed September 11, 1922. Serial No. 587,369.

The improved electrical contact device that constitutes the present invention is primarily designed for use in connection with the water columns of steam boilers and in like situations where it is desired to close an electrical circuit through float actuated means. Particularly in the case of such a water column the float cannot be unduly large, so that a limit is placed on its buoyant action, and yet the float must be quite sensitive in its response to changes in liquid level in the column. For the foregoing reasons it is impracticable to employ an electrical switch of ordinary construction, and I have accordingly sought in designing the switch or contact device in hand, to provide one that will impose a minimum burden on the float whereby it is actuated and that at the same time will be simple in construction and not liable to get out of order.

To the accomplishment of the foregoing and related ends, said invention, then, consists of the means hereinafter fully described and particularly pointed out in the claims; the annexed drawing and the following description setting forth in detail certain mechanism embodying the invention, such disclosed means constituting, however, but one of various mechanical forms in which the principle of the invention may be used.

In said annexed drawing:—

Figure 1:
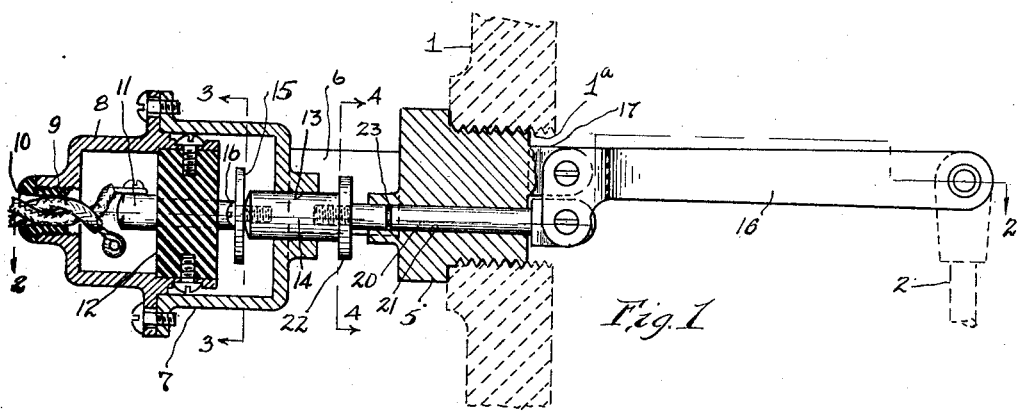
Figure 2:
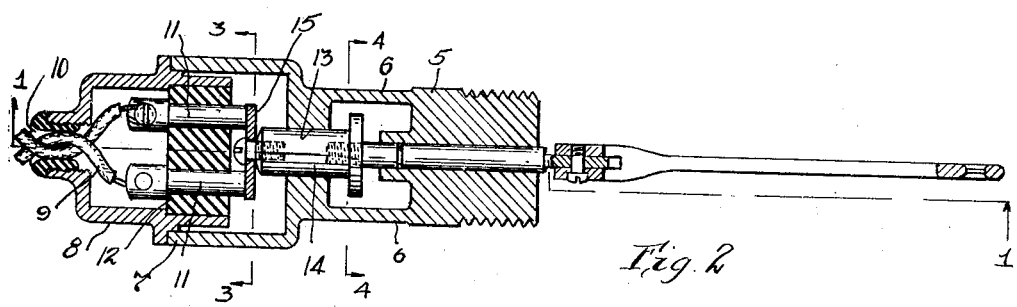
Figure 3:
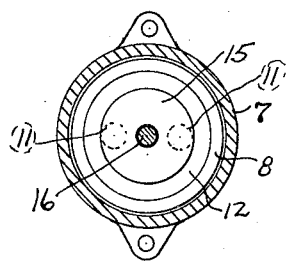
Figure 4:
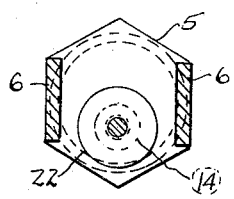

Fig. 1 is a vertical section through a contact device embodying my present improvements; Fig. 2 is a horizontal central section, the planes of the two sections shown in Figs. 1 and 2 lying at right angles to each other, as indicated by section lines on said figures, respectively; and Figs. 3 and 4 are transverse sections, the planes of the sections being indicated by the lines 3—3 and 4—4, Figs. 1 and 2.

Inasmuch as it is a matter of indifference whether my improved contact device be installed in a water column or other apparatus, it has not been considered necessary to illustrate such apparatus other than to show in dotted outline, (see Fig. 1) a broken section of the wall 1 of such apparatus, into which the device is designed to be inserted, and a portion of the stem 2 of the float or equivalent member within such apparatus whereby the device is operated.

One principal element of the device is an exteriorly threaded plug 5 that is fitted to an aperture 1ª in wall 1. Supported from such plug 5 as a base, by means of two arms 6, 6, is a horizontally extending cylindrical casing 7. The inner end of the latter is permanently closed, while the outer end is adapted to be closed by a supplemental casing 8. The two leads 9, that form the circuit, enter such supplemental casing through a suitable opening 10, the inner ends of such leads being secured to the outer ends of corresponding contact members 11 that are firmly mounted in a disk-like wall 12 of insulating material, that forms in effect a partition between the interior of said main casing 7 and the interior of said supplemental casing 8. Such insulating disk is secured to the supplemental casing, as shown in Fig. 1, so that upon detaching the latter from the main casing the aforesaid contact members are carried along therewith.

Reciprocably fitted in a suitable aperture 13, formed in the closed end of said main casing 7, is a plunger 14, likewise of insulating material, and attached to the inner end of such plunger is a contact disk 15 of a diameter sufficient to bridge the juxtaposed ends of contact members 11. Said disk is attached to the plunger by means of a screw 16, the aperture in the disk through which the screw passes being slightly larger than the body of the screw, as shown in Fig. 2, and the end of the plunger being slightly rounded so that the disk may partake of a limited oscillatory motion in any direction about the axis of the plunger, and thus insure flat contact with the ends of said members 11. Both the latter and said disk are preferably made of nickel or the nickel alloy known as Monel metal, or other equivalent non-corroding metal or alloy, so as to avoid oxidation and reduce sparking.

Reciprocation of the plunger occurs upon oscillation of an actuating bell crank lever 16 of the sort regularly employed in water columns, such lever being pivotally secured between ears 17, projecting inwardly from the plug 5, with its longer arm projecting horizontally from the latter, the float stem 2 previously referred to being in turn pivotally attached to the outer end of such arm. The inner shorter arm of the lever is connected with a rod 20 reciprocatably fitted, after the fashion of a valve stem or piston rod, in an aperture 21 in plug 5 that is aligned with plunger 14, the outer end of said rod being threaded into the adjacent end of the plunger. By rotating the latter in one direction or another the normal position or setting of the contact disk 15 may be adjusted as desired, and in order to secure the parts in such adjusted position a lock washer 22 is threaded on the rod 20 adjacent said plunger, said washer being of larger diameter than the plunger so as to serve as a drip collector. In other words, any steam that may escape through aperture 21 past the rod 20 and condense on the exposed portion of the latter will be prevented from running along the plunger into the housing 7. The rod 20 is furthermore formed with one or more peripheral grooves 23 to assist in preventing escape of steam past such rod.

It will be understood that both plunger 14 and the rod 20 that actuates the same, while fitting snugly in their respective apertures, are nevertheless loose enough so that they will reciprocate freely and so respond to the slightest movement of the float connected with lever 16. At the same time a sufficiently tight seal is secured to prevent any objectionable escape of steam through the plug 5, and the contacts proper are in any event so securely housed as to be amply protected. It should be explained in conclusion that, as shown in Fig. 1, the device is obviously arranged so that the circuit will be closed, i. e. the contact disk 15 will be pressed against contact members 11 when the outer end of the actuating lever 16 is depressed. In other words, when thus disposed, the device is arranged to close the circuit in case it is used with a water column, when the water in such column drops below a predetermined level. However, it will be obvious that if it is desired to have the circuit closed when the water rises to a predetermined level it is merely necessary to reverse the device, i. e. rotate it through an angle of 180 degrees from the position shown in the figure in question. Ordinarily the circuit will be employed to ring a bell or operate an equivalent type of alarm, but if desired the circuit may be employed to control a pump where it is desired to automatically maintain the water in the boiler at a predetermined level, or such circuit may be used in any other desired connection. With a device of the character in hand the current may be taken from an ordinary lighting circuit, i. e., a battery circuit need not be provided.

Other modes of applying the principle of my invention may be employed instead of the one explained, change being made as regards the mechanism herein disclosed, provided the means stated by any of the following claims or the equivalent of such stated means be employed.

I therefore particularly point out and distinctly claim as my invention:

1. In a device for closing an electric circuit, the combination of an apertured base member, a housing supported in spaced relation thereto and having an aperture approximately aligned with that in said base, a rounded head plunger reciprocable in the aperture in said housing and having a stem projecting through the aperture in said base, the projecting end of said stem being arranged for connection with desired actuating means, suitably insulated contacts in said housing adapted to be connected in an electrical circuit, a member rockably carried by the rounded head of said plunger within said housing and adapted to bridge said contacts, and drip-collecting means between said housing and base.

2. In a device for closing an electric circuit, the combination of an apertured base member, a housing supported in spaced relation thereto and having an aperture approximately aligned with that in said base, a plunger reciprocable in the aperture in said housing and having a stem projecting through the aperture in said base, the projecting end of said stem being arranged for connection with desired actuating means, suitably insulated contacts in said housing adapted to be connected in an electrical circuit, and a member carried by said plunger within said housing and adapted to bridge said contacts, said stem having an adjustable threaded connection with said plunger.

3. In a device for closing an electric circuit, the combination of a housing open at its one end, and having an aperture in its opposite end, a plunger reciprocable in said aperture and adapted to be connected to suitable operating means, a cap adapted to close the open end of said casing, an insulating member carried at the inner end of said cap, a pair of contacts extending through said member in spaced relation and adapted to be connected in an electric circuit, and an element carried by said plunger and adapted to bridge said contacts.

4. In a device for closing an electric circuit, the combination of a housing open at its one end, and having an aperture in its opposite end, a plunger reciprocable in said aperture and adapted to be connected to suitable operating means, a cup-shaped cap having an extension at its inner end adapted to be received snugly in the open end of said casing to close the same, said extension being counterbored to form an internal shoulder therein, a disc of insulating material snugly received in said counterbore against said shoulder, a pair of contacts extending through said disc in spaced relation and adapted to be connected in an electric circuit, and an element carried by said plunger and adapted to bridge said contacts.

Signed by me, this 7th day of September, 1922.

JOHN ROWLAND BROWN.